United States Patent
Birkelund (10) Patent No.: US 10,082,219 B2
(45) Date of Patent: Sep. 25, 2018

(54) SOLENOID VALVE (71) Applicant: DANFOSS A/S, Nordborg (DK)

(72) Inventor: Michael Birkelund, Middelfart (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 15/502,225

(22) PCT Filed: Jul. 10, 2015

(86) PCT No.: PCT/EP2015/064230
§ 371 (c)(1),
(2) Date: Feb. 7, 2017

(87) PCT Pub. No.: WO2016/041650
PCT Pub. Date: Mar. 24, 2016

(65) Prior Publication Data
US 2017/0234449 A1    Aug. 17, 2017

(30) Foreign Application Priority Data
Sep. 19, 2014 (EP) .................................. 14185569

(51) Int. Cl.
*F16K 31/06* (2006.01)

(52) U.S. Cl.
CPC ...... *F16K 31/0665* (2013.01); *F16K 31/0655* (2013.01); *F16K 31/0675* (2013.01)

(58) Field of Classification Search
CPC ................ F15B 13/043; F15B 13/0431; F15B 13/0433; F15B 13/0435; F16K 39/024; F16K 31/0665; F16K 31/0675

(Continued)

(56) References Cited

U.S. PATENT DOCUMENTS 2,965,350 A * 12/1960 Knaebel ................ F16K 31/408
251/30.03
3,865,140 A * 2/1975 Greenwood ........ F15B 13/0405
137/625.64

(Continued)

FOREIGN PATENT DOCUMENTS

CN        1272599 A    11/2000
CN      102330834 A     1/2012

(Continued)

OTHER PUBLICATIONS

International Search Report for PCT Serial No. PCT/EP2015/064230 dated Sep. 10, 2015.

*Primary Examiner* — Michael R Reid
(74) *Attorney, Agent, or Firm* — McCormick, Paulding & Huber LLP (57) ABSTRACT

A solenoid valve (1) is provided comprising a housing, an inlet, an outlet, main valve means located between said inlet and said outlet, said main valve means comprising a main valve element, pilot valve means adjusting a pressure difference over said main valve element and having a pilot valve element, a coil, a yoke arrangement magnetically linked to said coil, and armature means for moving said pilot valve element. Such a solenoid valve should achieve a large opening stroke without unduly increasing the coil and yoke arrangement. To this end said armature means comprise a first part attractable by said yoke means to perform an opening stroke, and a second part carrying said pilot valve element, wherein said first part is movable relative to said second part in a first section of said opening stroke and is dragging said second part in a second section of said opening stroke following said first section.

20 Claims, 6 Drawing Sheets

(58) Field of Classification Search
USPC ............. 251/30.01, 30.02, 30.03, 30.04
See application file for complete search history.

(56) References Cited

U.S. PATENT DOCUMENTS

| | | |
|---|---|---|
| 3,970,282 A | 7/1976 | Hansen |
| 4,592,533 A | 6/1986 | Guglielmi et al. |
| 2003/0010832 A1 | 1/2003 | Kramer et al. |

FOREIGN PATENT DOCUMENTS

| | | |
|---|---|---|
| DE | 20 2005 013 233 U1 | 10/2005 |
| RU | 2068521 C1 | 10/1996 |
| RU | 42084 U1 | 11/2004 |
| RU | 84079 U1 | 6/2009 |
| WO | 2013097446 A1 | 7/2013 |

\* cited by examiner

SOLENOID VALVE

CROSS-REFERENCE TO RELATED APPLICATIONS

This application is a National Stage application of International Patent Application No. PCT/EP2015/064230, filed on Jul. 10, 2015, which claims priority to European Patent Application No. 14185569.2, filed on Sep. 19, 2014, each of which is hereby incorporated by reference in its entirety.

TECHNICAL FIELD

The invention relates to a solenoid valve comprising a housing, an inlet, an outlet, main valve means located between said inlet and said outlet, said main valve means comprising a main valve element, pilot valve means adjusting a pressure difference over said main valve element and having a pilot valve element, a coil, a yoke arrangement magnetically linked to said coil, and armature means for moving said pilot valve element.

BACKGROUND

Such a solenoid valve is known, for example, from DE 20 2005 013 233 U1.

The use of a pilot valve has the advantage that only the pilot valve element has to be actuated to control the function of the main valve means. The forces needed for moving the pilot valve element are much smaller than the forces needed for moving the main valve element. Therefore, a pilot control solenoid valve can be used to control fluids under high pressure, for example carbon dioxide, without dramatically increasing the coil and yoke arrangement.

In some cases it is required that a solenoid valve has a large opening stroke, i. e. the solenoid valve has a low flow resistance in fully open state. This means that the main valve means has to be opened to a rather large extend to that the main valve element must be able to perform a large opening stroke. Consequently, the pilot valve element must be able to perform a similar large openings stroke. When the pilot valve is closed, the armature means has the largest distance to the yoke arrangement so that the magnetic forces which can attract the armature means are quite low. Therefore, when a large opening stroke is required, the coil and yoke arrangement must be increased to a considerable size to generate the necessary magnetic attraction forces.

Such a solenoid valve can be, for example, used in a multiejector. In this case it is required to generate maximum velocity of the controlled gas at the so called motive nozzle. This is done by minimizing the pressure losses. One contribution to the low pressure loss comes from a large diameter or large opening when the valve is open. A large diameter here means that the main valve element needs to move a significant part of, as a rule, at least ¼ of the diameter of an outlet bore. This means that there are low magnetic forces available because the magnetic forces vary over the distance from the yoke arrangement to the armature means.

Furthermore, when the solenoid valve is used in a $CO_2$ system the pressure difference is significantly higher than for other refrigerants. In a $CO_2$ system pressure difference of at least 50 bar is possible and can be significantly higher, for example 90 bar.

This means that the valve has to open with relative weak magnetic forces while being able to cope with a significantly higher pressure difference.

SUMMARY

The object underlying the invention is to achieve a large opening stroke without unduly increasing the coil and yoke arrangement.

This object is solved with a solenoid valve as described above in that said armature means comprise a first part attractable by said yoke means to perform an opening stroke, and a second part carrying said pilot valve element, wherein said first part is movable relative to said second part in a first section of said opening stroke and is dragging said second part in a second section of said opening stroke following said first section, wherein an opening spring is located between said first part and said second part, said opening spring acting on said second part in opening direction.

In such a solenoid valve the coil and yoke arrangement generate a magnetic force which must be sufficient to attract the first part of the armature only. The first part of the armature can be moved over a first section of the opening stroke without the necessity of moving the second part. The first part of the armature means is accelerated by the magnetic forces and has, therefore, at the end of the first section of the opening stroke a certain speed and consequently a certain kinetic energy. Furthermore, the magnetic forces have also increased since the air gap has decreased. At the end of the first section of the opening stroke the first part comes in contact with the second part of the armature which then is moved under the action of the first part. For the movement of the second part of the armature the increased magnetic forces plus the kinetic energy of the first part can be used. The second part carries the pilot valve element, meaning that the pilot valve element can also be part of the second part. The combined energy is sufficient to pre-lift the pilot valve element from the pilot valve seat. This initial movement of the pilot valve element usually requires the largest forces. As soon as the pilot valve element has been lifted off the pilot valve seat, the forces tending to close the pilot valve means or keeping the pilot valve means closed decrease so that the second part can be moved further together with the first part in an opening direction. When the pilot valve element has been lifted off the pilot valve seat under the action of the first part, the opening spring is slightly compressed. The opening spring now moves the second part relative to the first part further in opening direction thus increasing a distance between the pilot valve element and the pilot valve seat. This is possible due to the low force from the differential pressure at the pilot valve element. This low force is due to the relative large distance between the pilot valve element and the pilot valve seat or pilot orifice after the pre-lift. When the pilot orifice is open, the main valve element moves and opens the main valve means. This opening can occur in a rather short time period so that the solenoid valve can be actuated with a rather high speed. The opening of the pilot valve now is divided in three sections of movement. In the first section only the first part moves. In the second section the first part moves together with the second part and the pilot valve element. In the third section the first part has been stopped and the pilot valve element together with the second part moves under the action of the opening spring. During the first section, when the first part is moved alone, this first part builds up kinetic energy and moves closer to the yoke arrangement whereby the magnetic forces increase significantly since the air gap decreases. Both elements contribute to the pre-lifting of the pilot valve element against the significant pressure difference over the pilot valve element. At the end of the third movement the second part rests against the yoke arrangement. The third movement is achieved by utilizing the spring forces created by the compression of the opening spring during the second movement.

In a preferred embodiment said pilot valve means has a pilot orifice and the length of said second section is in the range of 0.5 to 1.5 times the diameter of said pilot orifice. The second part of the armature is moved at an end of the opening stroke only, when the first part has enough kinetic energy. Since it is only necessary to pre-lift the pilot valve element the small movement of the second part of the armature at this moment is sufficient. Less than 0.5 means that the pressure difference becomes too big. More than 1.5 means that the magnetic forces become too small.

Preferably a closing spring is arranged between said first part and said yoke arrangement, said closing spring being compressed during said opening stroke. The closing spring is used at a later stage when the main valve is to be closed.

Preferably said opening spring is stronger than said closing spring. In other words, the spring constant of the opening spring is typically larger than the spring constant of the closing spring. This takes into account that the closing spring is compressed during the opening stroke to a slightly larger extend.

Preferably said second part is located inside said first part. This leads to rather simple construction. The armature can still be handled as a single piece simplifying assembling of the solenoid valve.

In this case it is preferred that said first part comprises a hollow first sleeve and a hollow second sleeve which are connected to each other to form a space in which said second part is accommodated. The two sleeves can for example be fixed to each other by screwing, by using a glue or by soldering or they can be joined by a press-fit connection. The use of hollow sleeves facilitates the guiding of the second part within the first part.

Preferably said first sleeve has a bore at a side facing said yoke arrangement, said bore ending at a step supporting said closing spring. The closing spring rests against the step and against the yoke arrangement. The bore is helpful in guiding the spring so that the spring keeps its position in any case.

Preferably said second part comprises a stem protruding through said bore. The stem in said bore is used for guiding the second part within said first part.

Preferably said stem is longer than said first sleeve. This feature can be used to improve the closing process of the solenoid valve. The magnetic sticking force is overcome by the force of the opening spring. Since the stem is longer than the first sleeve, the opening spring pushes the first part in a direction towards the pilot valve seat. Once the first parts abuts the second part the opening spring does no longer contribute to further movement of the first part and further movement of the first and second parts is achieved by the closing spring. The magnetic sticking is reduced by a large amount, for example, 90%, once an air gap between the yoke arrangement and the armature is established and therefore the closing spring can close the valve even if it is weaker.

Preferably said housing comprises a stop for said main valve element in opening direction, said second part of said armature being retracted behind said stop at the end of said opening stroke. This is a protection for the pilot valve element avoiding high forces on the pilot valve element in the fully open state of the main valve means.

The invention relates as well to the use of a solenoid valve as described above in a $CO_2$ refrigeration system. The solenoid valve is in particular well suited to operate even if high pressure differences act over the pilot valve means.

BRIEF DESCRIPTION OF THE DRAWINGS

A preferred embodiment of the invention now is described in more detail with reference to the drawing, wherein.

DETAILED DESCRIPTION

Figure 1:
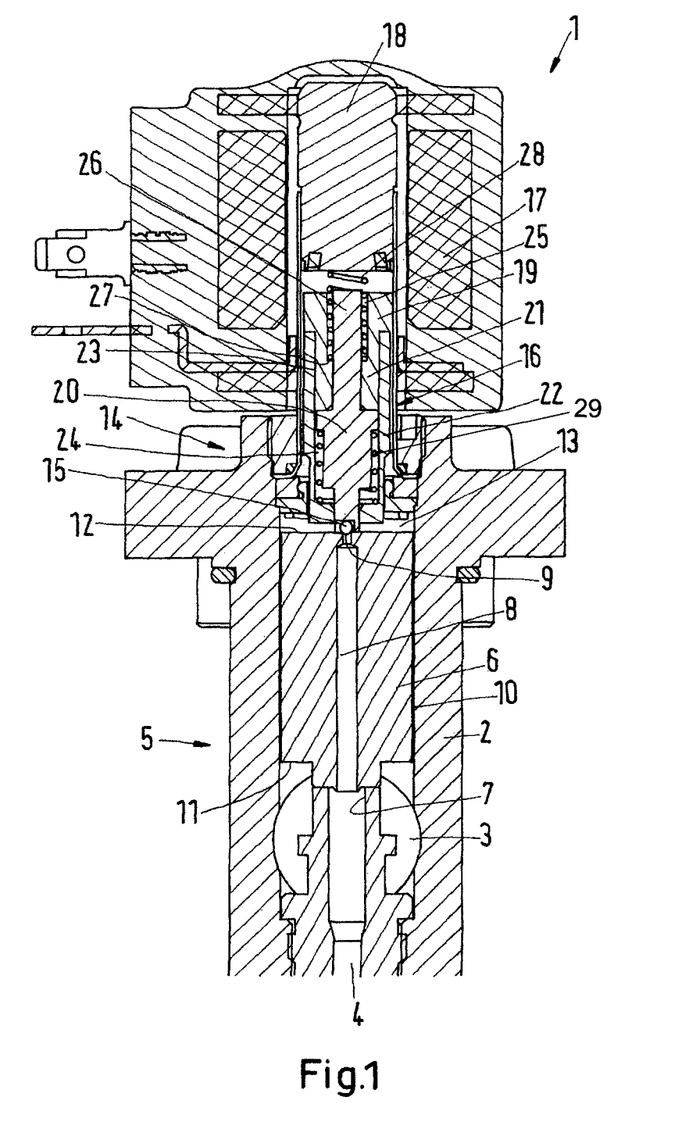
FIG. 1 is a sectional view of a solenoid valve in close condition.

FIG. 1 shows a solenoid valve 1 having a housing 2. The housing 2 comprises an inlet 3 and an outlet 4. The solenoid valve 1 can, for example, be used for controlling a fluid under high pressure like carbon dioxide.

The control of such a fluid is performed by main valve means 5 having a main valve element 6 and a main valve seat 7.

Figure 4:
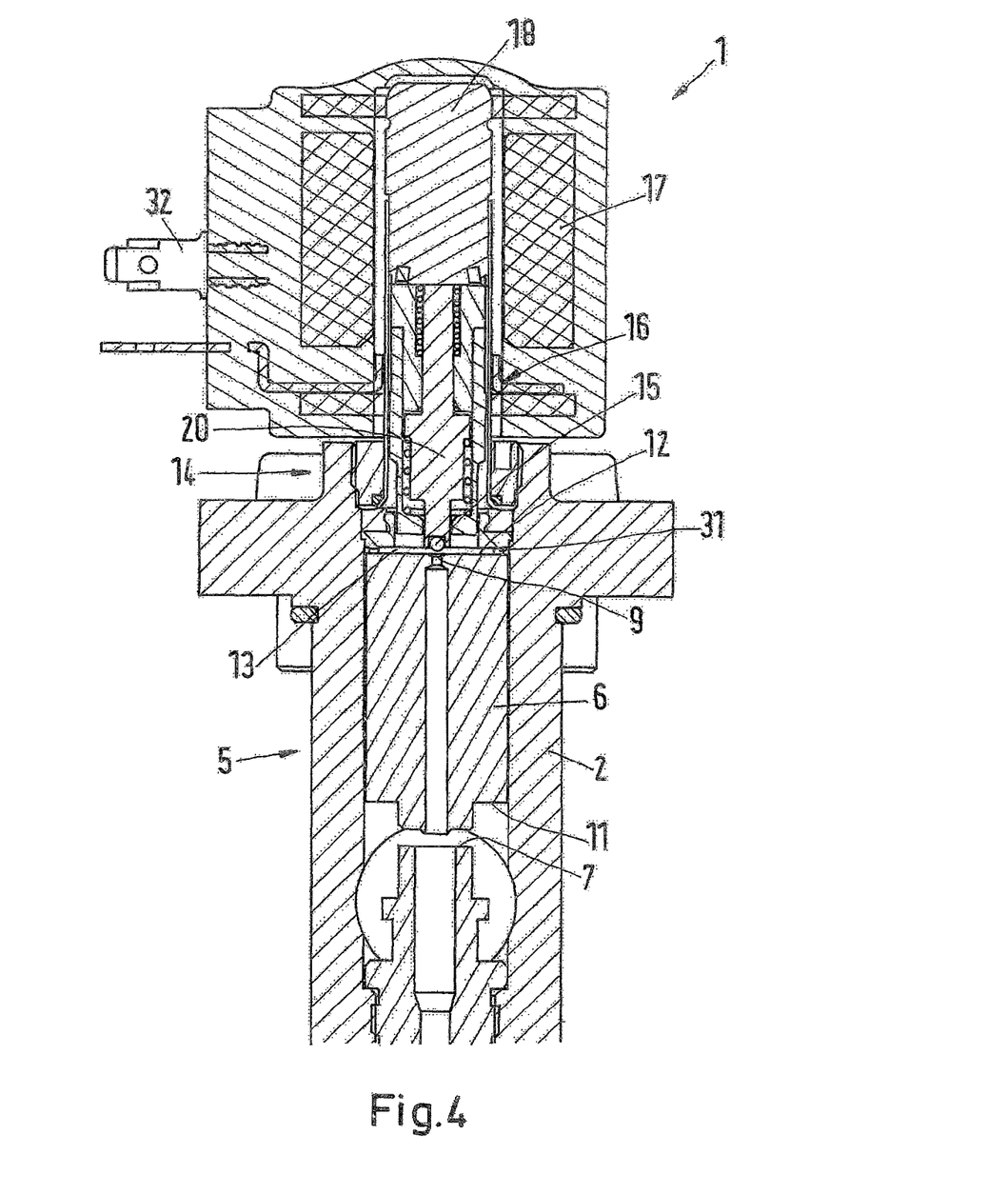
FIG. 4 is a sectional view of said solenoid valve with the main valve means fully open.
Figure 5:
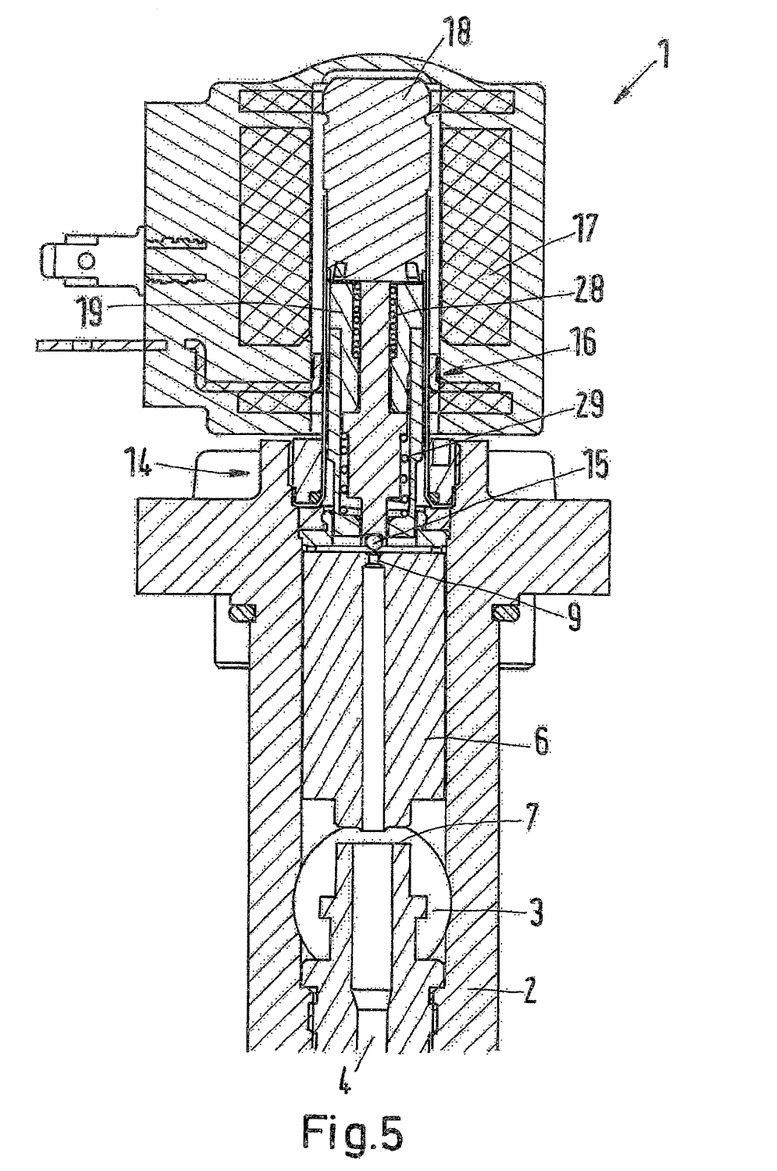
FIG. 5 is a sectional view of said solenoid valve at the beginning of closing of the pilot valve means.
Figure 6:
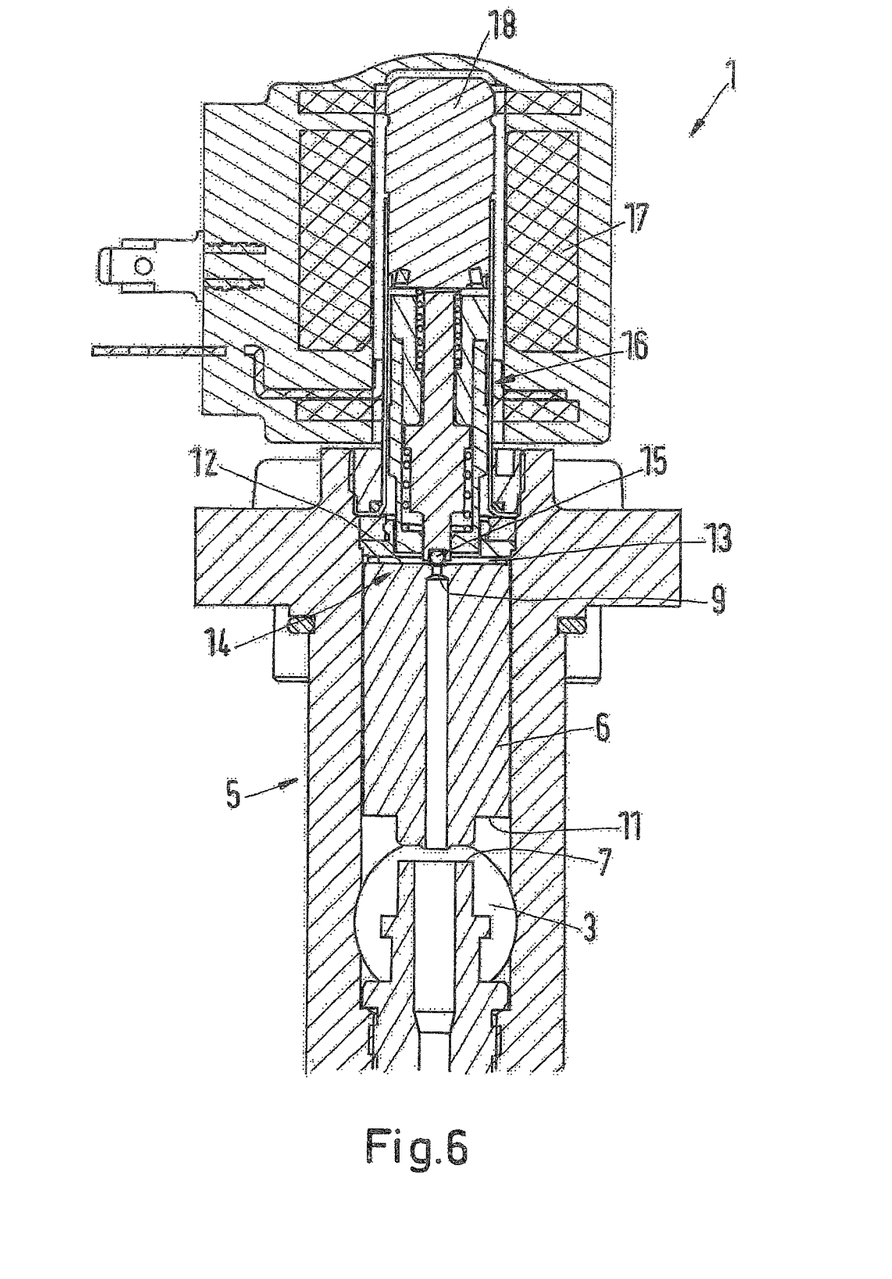
FIG. 6 is a sectional view of said solenoid valve showing the closing of the main valve means.

The main valve element 6 has the form of a piston having a channel 8 running in lengthwise direction through the complete valve element 6. One end of this channel 8 opens into the main valve seat 7 (in closed condition) or is directed into the main valve seat 7 (in open condition, c. f. FIGS. 4 to 6). The other end of the channel 8 forms a pilot orifice 9. This pilot orifice 9 can also be named "pilot valve seat".

A small gap between the main valve element 6 and the housing 2 is unavoidable and in the present case intended so that a fluid pressure from the inlet 3 can act on both front faces 11, 12 of the main valve element 6, i.e. in a pressure space 13 on a side of the main valve element 6 opposite to said main valve seat 7. The area of the front face 11 surrounding the main valve seat 7 is smaller than the area of the opposite front face 12 so that the main valve element 6 is held against the main valve seat 7 by the resulting force difference and the main valve means 5 are closed.

Furthermore, the solenoid valve 1 comprises pilot valve means 14. The pilot valve means 14 comprise a pilot valve element 15 cooperating with the pilot orifice 9, i. e. closing the pilot orifice 9 (FIGS. 1 and 6) or opening it (FIGS. 2-5).

Movement of the pilot valve element 15 is performed by an armature 16 which will be described later.

The solenoid valve 1 comprises a coil 17 and a yoke arrangement 18 (only partly shown). When the coil 17 is supplied with electric current, the yoke arrangement 18 which is magnetically linked to the coil 17 generates a magnetic force acting on the armature 16.

The armature 16 comprises a first part 19 and a second part 20. The first part 19 is formed of a first sleeve 21 and a second sleeve 22. Both sleeves 21, 22 are hollow. They are connected to each other in a connection area 23. They can, for example, be joined by a press-fit connection or connected by means of a pair of threadings, they can be glued together or brazed together or connected to each other in any other way. The first part 19 is made from a magnetizable material, whereas there are no similar requirements to the second part 20.

The two sleeves 21, 22 together form a space 24 in which the second part 20 of the armature is accommodated. The second part 20 of the armature 16 carries the pilot valve element 15.

The first sleeve 21 comprises a bore 25 through which a stem 26 of the second part is guided. Furthermore, the bore 25 forms a step 27. A closing spring 28 rests against this step 27. The other end of the closing spring 28 rests against the yoke arrangement 18. When the first part 19 is moved in a direction towards the yoke arrangement 18, the closing spring 28 is compressed.

An opening spring 29 is arranged in the space 24 within the first part 19 as well. This opening spring 29 acts between the first part 19 and the second part 20 and presses the second part 20 against the first sleeve 21.

The state shown in FIG. 1 is the closed state of the solenoid valve 1. The closing spring 28 acts on the whole armature 16 in a direction towards the pilot orifice 9. The pilot valve element 15 rests against the pilot orifice 9 and closes the pilot valve means 14. In this state there is no current in coil 17.

Figure 2:
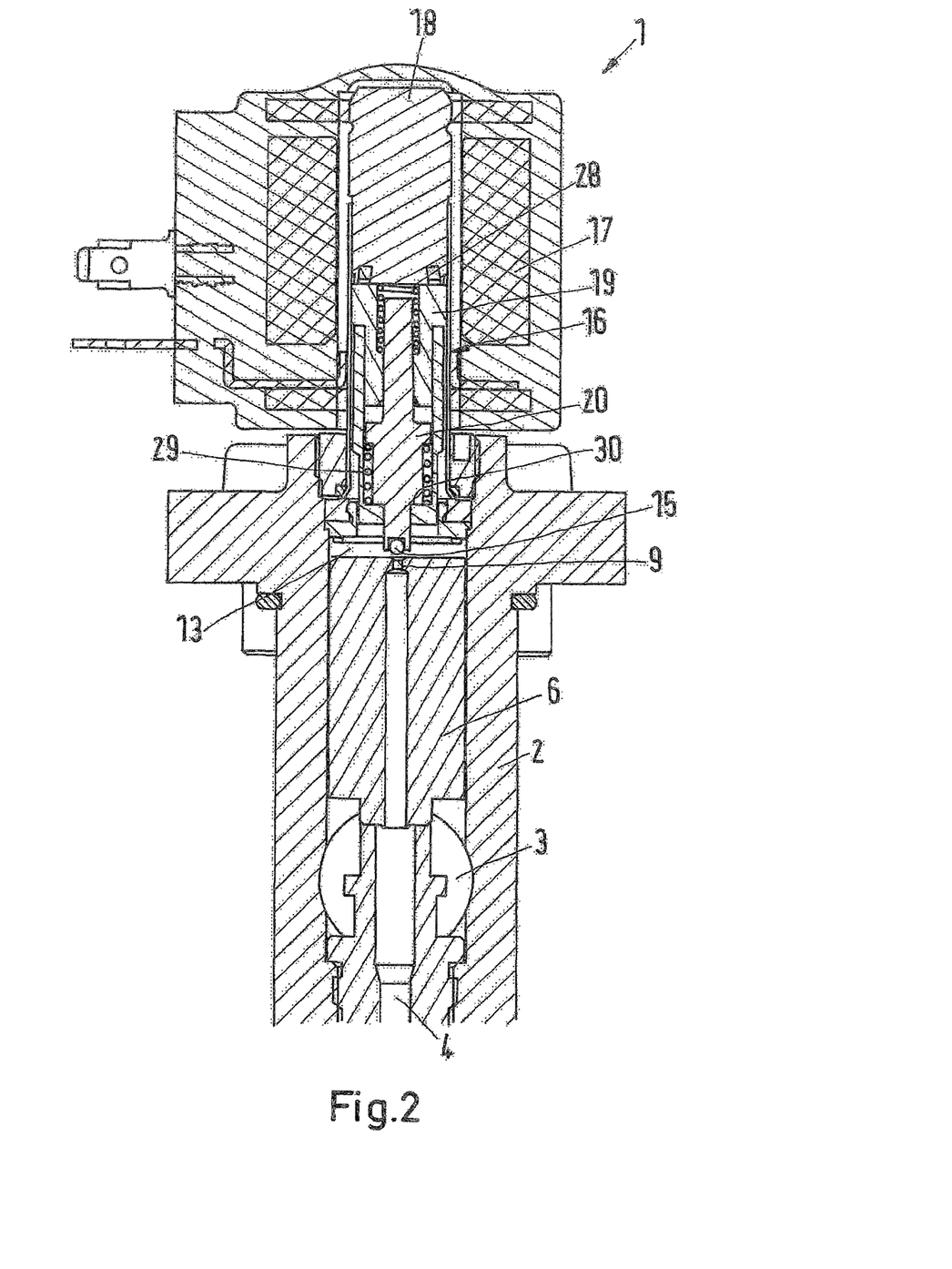
FIG. 2 is a sectional view of the solenoid valve at a beginning of the opening of a pilot valve means.

FIG. 2 shows the situation in which the coil 17 is supplied with current. Therefore, magnetic forces are generated in the yoke arrangement 18 attracting the first part 19 of the armature 16.

All elements are designated with the same reference numerals in all figures.

As can be seen in FIG. 2 the first part 19 of the armature 16 has been moved relative to the second part 20 of the armature.

The first part 19 has been moved over an opening stroke, i. e. from the position shown in FIG. 1 in which the first part 19 has the largest distance to the yoke arrangement 18 to a position shown in FIG. 2 in which the first part 19 has come to rest against the yoke arrangement 18.

This opening stroke has some sections. In a first section the first part 19 can be moved relative to the second part 20 of the armature without moving the second part 20 of the armature 16. In a second section of the opening stroke the first part 19 has come in contact with a step 30 at the lower end of the second part 20 and pulls or drags the second part 20 upon further movement of the first part 19.

During movement of the first part 19, the closing spring 28 and the opening spring 29 are compressed.

At the end of the first section, the first part 19 of the armature has already a certain speed and correspondingly a certain kinetic energy. This kinetic energy can be used to move the second part 20 of the armature 16 as well. This movement can be rather small, for example less than 1 mm. In general, the second section of the opening stroke has a length in the range of 0.5 to 1.5 times the diameter of the pilot orifice 9. Less than 0.5 means that the pressure difference becomes too big. More than 1.5 means that the magnetic forces become too small. The movement of the second part 20 is sufficient when the pilot valve element 15 is just lifted off the pilot orifice 9 so that fluid out of the pressure space 13 can start to escape out of the pressure space 13 thereby lowering the pressure in the pressure space 13. This state can be termed as "pre-lift".

As shown in FIG. 2, the first part 19 has come in contact with the yoke arrangement 18 thereby compressing the closing spring. Furthermore, the opening spring 29 between the first part 19 and the second part 20 is compressed as well.

Figure 3:
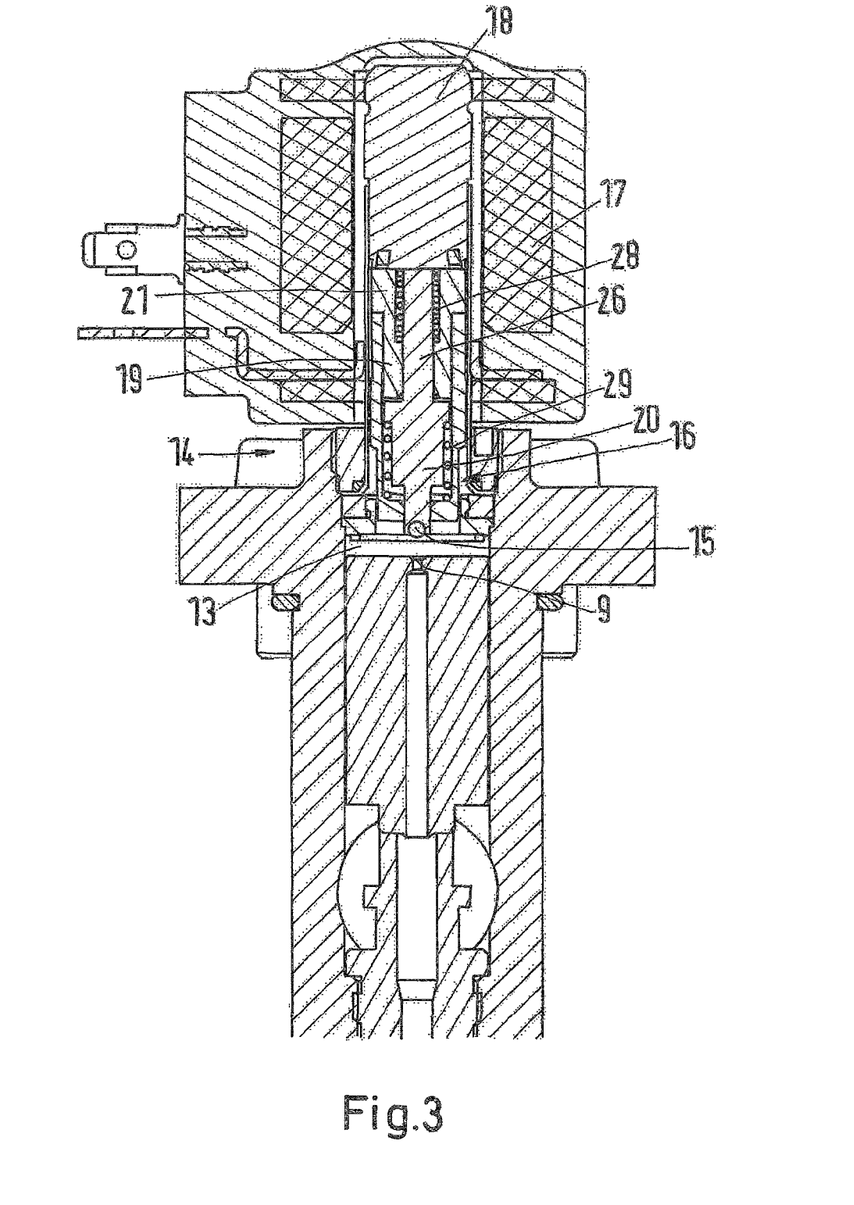
FIG. 3 is a sectional view of said solenoid valve with the pilot valve means fully open.

As shown in FIG. 3, the opening spring 29 moves the second part 20 further in opening direction, i. e. in a direction towards the yoke arrangement 18 until the stem 26 comes in contact with the yoke arrangement 18 as well. This is a third section of movement. Consequently, the pilot valve element 15 is moved further away from the pilot orifice 9. This movement is possible due to the low force from the differential pressure at the pilot valve element 15. This low force is due to the relative large distance between the pilot valve element 15 and the pilot orifice 9 after pre-lift. FIG. 3 shows the fully open condition of the pilot valve means 14.

When the pilot valve means 14 are open the pressure in the pressure space 13 decreases and consequently the pressure acting on the lower front face 11 generates a force higher than the pressure acting on the opposite front face 12 of the main valve element 6. The main valve element 6 moves away from the main valve seat 7 and opens the main valve means 5.

As can be seen in FIG. 4, the housing 2 has a stop 31 for the movement of the main valve means 6 in opening direction. The pilot valve element 15 is retracted behind this stop 31 when the second part 20 of the armature 16 has come in contact with the yoke arrangement 18. Therefore, high forces acting on the pilot valve element 15 by the main valve element 6 can be reliably avoided.

FIG. 4 shows the solenoid valve 1 in fully open condition. This condition remains as long as current is supplied to coil 17. The supply of current to coil 17 can be made over an electric connection 32 schematically shown.

When the supply of current to coil 17 is stopped, no magnetic forces are generated in the yoke arrangement 18.

When the current is switched off, the closing process starts. The magnetic sticking force is overcome by the force of the opening spring 29. Since the stem 26 is longer than the first sleeve 21, the opening spring 29 pushes the first part 19 away from the yoke arrangement 18 in a direction towards the pilot valve orifice 9. Once the first part 19 abuts the second part 20 the opening spring 29 does no longer contribute to further movement of the first part (as shown in FIG. 5) and further movement of the first and second part 19, 20 is achieved by the weaker closing spring 28. The magnetic sticking is reduced by, for example, 90% once an air gap between the yoke arrangement 18 and the top of the armature 16 is established and therefore the closing spring 28 can close the pilot valve even when it is weaker than the opening spring 29.

In FIG. 5 the armature 16 has moved away a bit from the yoke arrangement 18. However, in FIG. 5 the pilot valve means 15 has still a distance from the pilot orifice 9 so that the pilot valve means 14 are not yet closed.

FIG. 6 shows the situation in which the armature 16 has been moved far enough in a direction towards the main valve element 6 to close the pilot valve means 14, i. e. the pilot valve element 15 has closed the pilot orifice 9. In this situation the pressure space 13 has no outlet through which fluid arriving from the inlet 3 can escape. The pressure acting on the upper front face 12, i. e. the front face facing the yoke arrangement 18 acts on the main valve element 6 in a direction towards the main valve seat 7. The same pressure acts on the opposite front face 11, however, on a smaller area since the valve seat 7 covers part of the front face 11. In a region of the front face covered by the main valve seat 7, there is a lower pressure.

The difference of forces over the main valve element 6 moves the main valve element 6 in a direction towards the main valve seat 7 so that finally the main valve element 6 comes to rest the main valve seat 7 and the main valve means 5 close, as shown in FIG. 1. The closure spring 28 does also contribute.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A solenoid valve comprising:
a housing,
an inlet,
an outlet,
main valve means located between said inlet and said outlet, said main valve means comprising a main valve element,
pilot valve means adjusting a pressure difference over said main valve element and having a pilot valve element,
a coil,
a yoke arrangement magnetically linked to said coil, and
armature means for moving said pilot valve element,
wherein said armature means comprise a first part attractable by said yoke means to perform an opening stroke, and a second part carrying said pilot valve element, wherein said first part is movable relative to said second part in a first section of said opening stroke and is dragging said second part in a second section of said opening stroke following said first section, wherein said first part is movable relative to said second part in a first section of a closing stroke and is pushing said second part in a second section of said closing stroke following said first section, and wherein an opening spring is located between said first part and said second part, said opening spring acting on said second part in an opening direction.

2. The solenoid valve according to claim 1, wherein said pilot valve means has a pilot orifice and the length of said second section of said opening stroke is in the range of 0.5 to 1.5 times the diameter of said pilot orifice.

3. The solenoid valve according to claim 1, wherein a closing spring is arranged between said first part and said yoke arrangement, said closing spring being compressed during said opening stroke.

4. The solenoid valve according to claim 3, wherein said opening spring is stronger than said closing spring.

5. The solenoid valve according to claim 1, wherein said second part is located inside said first part.

6. The solenoid valve according to claim 5, wherein said first part comprises a hollow first sleeve and a hollow second sleeve, which are connected to each other to form a space in which said second part is accommodated.

7. The solenoid valve according to claim 6, wherein said first sleeve has a bore at a side facing said yoke arrangement, said bore ending at a step supporting said closing spring.

8. The solenoid valve according to claim 7, wherein said second part comprises a stem protruding through said bore.

9. The solenoid valve according to claim 8, wherein said stem is longer than said first sleeve.

10. The solenoid valve according to claim 1, wherein said housing comprises a stop for said main valve element in an opening direction, said second part of said armature being retracted behind said stop at the end of said opening stroke.

11. A CO2 refrigeration system comprising:
a solenoid valve comprising:
a housing,
an inlet,
an outlet,
main valve means located between said inlet and said outlet, said main valve means comprising a main valve element,
pilot valve means adjusting a pressure difference over said main valve element and having a pilot valve element,
a coil,
a yoke arrangement magnetically linked to said coil, and
armature means for moving said pilot valve element,
wherein said armature means comprise a first part attractable by said yoke means to perform an opening stroke, and a second part carrying said pilot valve element, wherein said first part is movable relative to said second part in a first section of said opening stroke and is dragging said second part in a second section of said opening stroke following said first section, wherein said first part is movable relative to said second part in a first section of a closing stroke and is pushing said second part in a second section of said closing stroke following said first section, and wherein an opening spring is located between said first part and said second part, said opening spring acting on said second part in an opening direction.

12. A solenoid valve comprising:
a housing,
an inlet,
an outlet,
a main valve located between said inlet and said outlet, said main valve comprising a main valve element,
a pilot valve adjusting a pressure difference over said main valve element and having a pilot valve element,
a coil,
a yoke arrangement magnetically linked to said coil, and
an armature for moving said pilot valve element, said armature comprising a first part attractable by said yoke arrangement to perform an opening stroke, and a second part carrying said pilot valve element,
wherein said first part is slidably coupled to said second part, with one of said first part or said second part including a portion slidably captured within a space formed in the other of said first part or said second part such that, in a first section of said opening stroke, said first part is movable relative to said second part as the portion slides within the space, and, in a second section of said opening stroke following said first section, said first part is dragging said second part with the portion positioned at a first end of the space, and such that, in a first section of a closing stroke, said first part is movable relative to said second part as the portion slides within the space, and, in a second part of said closing stroke following said first section, said first part is pushing said second part with the portion positioned at a second end of the space, and
wherein an opening spring is located between said first part and said second part, said opening spring acting on said second part in an opening direction.

13. The solenoid valve according to claim 12, wherein said second part comprises the portion and wherein the portion is located inside said first part.

14. The solenoid valve according to claim 13, wherein said first part comprises a hollow first sleeve and a hollow second sleeve, which are connected to each other to form the space in which the portion of said second part is accommodated.

15. The solenoid valve according to claim 14, wherein said first sleeve has a bore at a side facing said yoke arrangement, said bore ending at a step supporting said closing spring.

16. The solenoid valve according to claim 15, wherein said second part comprises a stem protruding through said bore.

17. The solenoid valve according to claim 16, wherein said stem is longer than said first sleeve.

18. The solenoid valve according to claim 12, wherein a closing spring is arranged between said first part and said yoke arrangement, said closing spring being compressed during said opening stroke.

19. The solenoid valve according to claim 18, wherein said opening spring is stronger than said closing spring.

20. The solenoid valve according to claim 12, wherein said housing comprises a stop for said main valve element in the opening direction, said second part of said armature being configured to be retracted behind said stop at the end of said opening stroke.

* * * * *